Sept. 22, 1925.  
A. WOLLENSAK  
1,554,939
LENS HOLDER FOR OPTICAL INSTRUMENTS
Original Filed Nov. 17, 1922
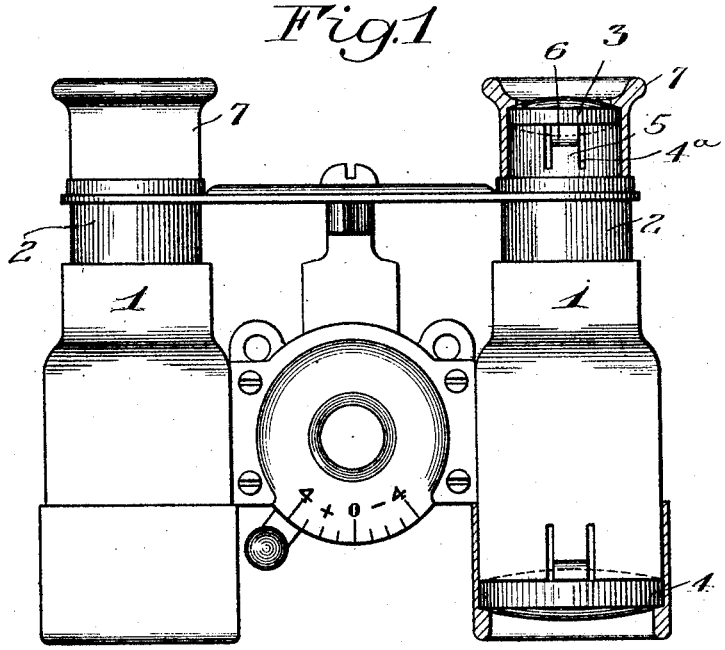
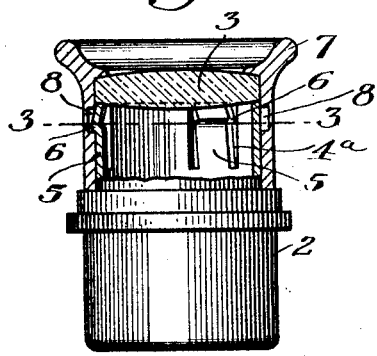
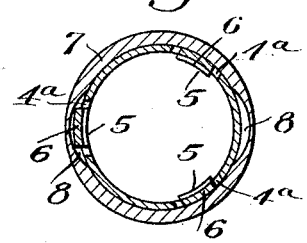
INVENTOR.  
*Andrew Wollensak*  
BY *Frederick F. Church*  
his ATTORNEY Patented Sept. 22, 1925.

1,554,939

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

LENS HOLDER FOR OPTICAL INSTRUMENTS.

Original application filed November 17, 1922, Serial No. 601,583. Divided and this application filed November 15, 1923. Serial No. 674,989.

*To all whom it may concern:*

Be it known that I, ANDREW WOLLENSAK, a citizen of the United States, residing at Rochester, in the county of Monroe and State of New York, have invented certain new and useful Improvements in Lens Holders for Optical Instruments; and I do hereby declare the following to be a full, clear, and exact description of the same, reference being had to the accompanying drawings, forming a part of this specification, and to the reference numerals marked thereon.

My present invention relates to optics and more particularly to instruments such as telescopes and binoculars and it has for its object to provide a simple and efficient means for holding the lenses thereof in place whereby the latter may be readily removed for cleaning, the improvements also contributing to the facility with which the instrument is assembled in the first instance. To these and other ends the invention resides in certain improvements and combinations of parts all as will be hereinafter more fully described, the novel features being pointed out in the claims at the end of the specification.

In the drawings:

Figure 1 is a side view of a binocular constructed in accordance with and illustrating one embodiment of my invention, one of the lens tubes being partly in longitudinal central section.

Figure 2 is an enlarged sectional view through one of the eye pieces in a plane different from that of Figure 1.

Figure 3 is a transverse section on the line 3—3 of Figure 2.

Similar reference numerals throughout the several views indicate the same parts.

This application is a division of my prior application, Serial No. 601,583, filed November 17, 1922 wherein is described and claimed a focusing mechanism for binoculars. I therefore illustrate in this application a binocular of the same character comprising two parallel outer lens tubes 1 and an inner lens tube 2 slidable in each. The lenses of the lens system, respectively, carried by the outer and inner tube and comprising the lenses 3 and 4, are mounted in the same manner and a description of the eye piece lens 3 will therefore suffice for both. The end of the inner tube 2 at one or more points is slotted at 4ª to form one or more fingers 5 having lugs 6 bumped out of the material thereof. The lens 3 rests against the end of the tube where it is held by a cap piece 7 that fits over the tube. A groove 8 on the inside of the cap piece forms a shoulder with which the lug 6 springs into locking engagement when the cap piece is applied. It will yield, however, when force is used to remove the cap piece and in this way the lens can be conveniently removed for cleaning.

This arrangement is not only useful for cleaning the lenses but permits the binocular, telescope or other similar instrument to be quickly assembled by relatively unskilled persons.

I claim as my invention:

1. The combination with a lens tube and a lens seated on the end thereof, of a cap having a slip fit over the end of the tube to hold the lens in place and interiorly arranged yielding means operating to lock the cap to the tube and embodying a movable element on the tube interlocking with an inner wall of the cap.

2. The combination with a lens tube having longitudinal slots at its ends forming a finger, said finger being provided with an outstanding lug, of a lens-carrying cap piece engaging over the tube and provided with an inner shoulder with which the lug yieldably locks.

ANDREW WOLLENSAK.